Aug. 2, 1955  A. D. HILL  2,714,519
OUTLET BOX HAVING AN INTEGRAL CONDUIT SECURING MEANS
Filed June 9, 1953

INVENTOR.
ARLIE D. HILL
BY George Sipkin
George E. Pearson
ATTORNEYS

United States Patent Office 2,714,519
Patented Aug. 2, 1955

2,714,519

OUTLET BOX HAVING AN INTEGRAL CONDUIT SECURING MEANS

Arlie D. Hill, San Diego, Calif.

Application June 9, 1953, Serial No. 360,622

5 Claims. (Cl. 285—24.5)

(Granted under Title 35, U. S. Code (1952), sec. 266)

The invention described herein may be manufactured and used by or for the Government of the United States of America for governmental purposes without the payment of any royalties thereon or therefor.

This invention relates to electrical distribution systems and more particularly to a novel conduit junction or outlet box including means for securely joining and electrically connecting the box to a conventional thin wall type of pipe used for protecting electrical wiring in electrical distribution systems.

The junction or outlet boxes generally used are connected to the pipe conduit by complicated fittings which require a great deal of time and effort to manipulate and attach to the pipe, and also require a slight off-set which also consumes time and effort to form in the pipe, where it is desired to lay the pipe flush with the wall on which the conduit box is mounted. The conduit box of the present invention eliminates the connecting means such as bushings, lock nuts, etc., previously required, and provides a simple, economical and strong construction which provides additional space within the box and simplifies the guidance of wires into and through the boxes, since no offsets are required to provide a flush entrance.

One preferred embodiment of the present invention consists essentially of a rectangular metal box which is formed from a flat sheet and folded up into a box-like structure by bending along certain lines. A plurality of openings of a size slightly smaller than the pipe conduit to be accommodated is formed in the side walls of the sheet metal prior to folding into the box. Diametrically opposed slits extend outwardly from the opening and have one or more smaller apertures formed therein at spaced intervals from the main opening. In one preferred form a rectangular extension of the circular opening forms a keyhole-shaped opening or slot with the junction between the circular and rectangular portions approximately at the bend line of the side wall. The undersized opening is spread slightly by inserting tapered pins in the adjacent apertures to spread the openings sufficiently to insert the pipe conduit. On releasing the pins, the walls of the opening firmly engage the pipe conduit to provide a strong physical and electrical connection. In the preferred form utilizing the keyhole-shaped opening across the bend line, the pipe conduit is flush with the bottom of the box to provide a straight line run for wiring extending through the pipe conduit into the junction or outlet box.

One object of the present invention is to provide a junction box which eliminates the necessity for bushings, locknuts and other types of connectors between the pipe conduits and the box with a rugged, simple and economical construction.

Another object of the present invention is to provide a conduit fitting box wherein the conduit enters the box substantially flush with the bottom surface and is securely retained in position without any fittings or other means of attachment to the box, with the conduit laying flat and straight on the surface to which the box and conduit are secured.

Other objects and many of the attendant advantages of this invention will be readily appreciated as the same becomes better understood by reference to the following detailed description when considered in connection with the accompanying drawings wherein.

Figure 1:
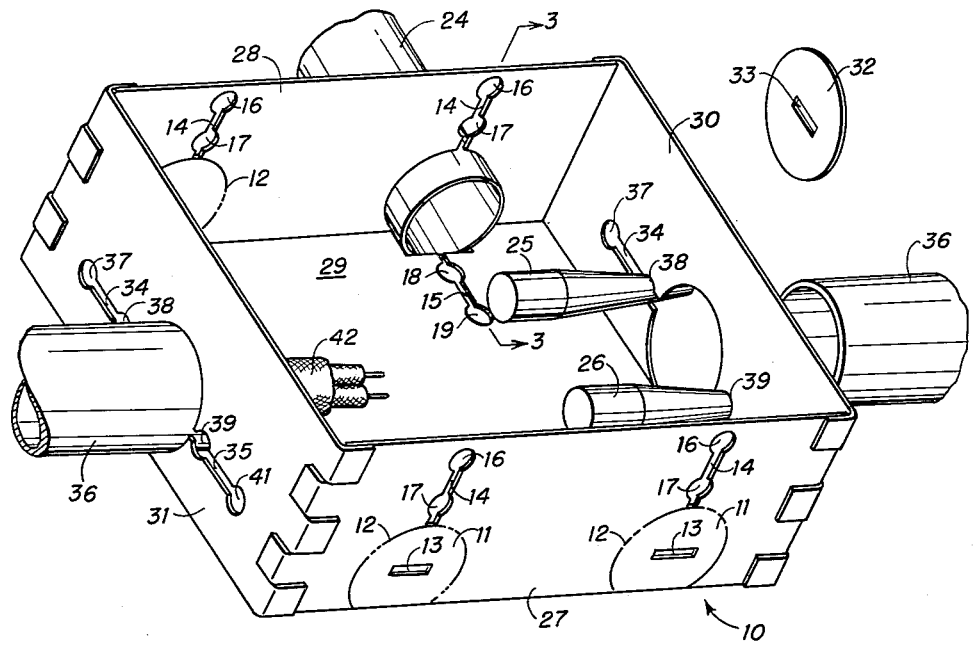
Fig. 1 is a pictorial view illustrating one preferred embodiment of the present invention.
Figure 2:
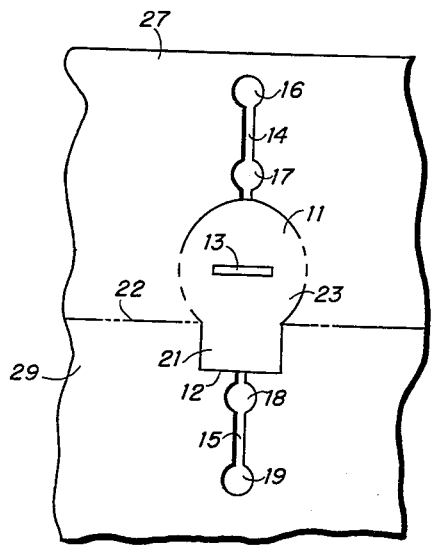
Fig. 2 is a plan view of a portion of the sheet metal box shown in Fig. 1 prior to bending into the box-like shape shown.
Figure 3:
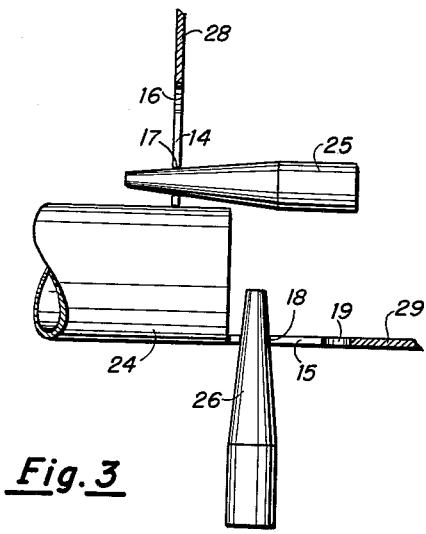
Fig. 3 is a sectional view taken on a line 3—3 of Fig. 1.

Referring now to the drawings in detail, one preferred embodiment of the conduit box of the present invention is shown in Figs. 1, 2 and 3 wherein the junction or outlet box 10 is preferably formed from a flat sheet of metal with the sides bent up to form a box-like structure as shown.

A plurality of knock-out pieces 11 are partially cut out of the sheet metal blank along the line 12 to facilitate break-off when the piece 11 is pried out by a screwdriver inserted in the slot 13. An elongated slot 14 and another slot 15 extend in opposite directions diametrically from the piece 11, and a plurality of small, circular apertures 16, 17, 18 and 19 are formed across the slots 14 and 15.

The circular portion of the opening formed by removal of the knock-out piece 11 is slightly out of round or elliptical with a slightly smaller dimension transversely with respect to the slots 14 and 15.

Referring particularly to Fig. 2, the knockout piece 11 is provided with a rectangular portion 21 on the opposite side of the bend line 22 from the circular portion 23. When the knockout piece 11 is removed after the sidewall of the box has been bent up along the line 22, the pipe conduit 24 is adapted to extend through the circular portion of the opening with its lower edge seated in the rectangular portion 21 as shown in Fig. 3 so that the outer surface of the pipe conduit 24 is in the same plane with the outer surface of the junction or outlet box 10.

In order to insert the conduit, a pair of small, tapered expander tools 25 and 26 are inserted in the two small apertures 17 and 18 adjacent the knockout piece 11 and driven in until the circular portion 23 of the opening is expanded sufficiently so that the pipe conduit 24 slips into the opening. When the expander tools 25 and 26 are removed the conduit 24 is securely clamped and held in the conduit box without the provision of any further fittings or securing means.

In Fig. 1 the junction or outlet box 10 has been shown with side walls 27 and 28 and bottom wall 29 provided with openings, slots, and apertures such as those shown in Figs. 2 and 3; but the end walls 30 and 31 are provided with a slightly modified form of the present invention wherein a completely circular knockout piece 32 is provided having a pry-out slot 33. Removal of the knockout piece 32 leaves a substantially circular opening which is also slightly out of round or elliptical with a dimension transverse to the slots 34 and 35 which is slightly less than the diameter of the pipe conduit 36. The small apertures 37, 38, 39 and 41 are similar to the apertures shown in Figs. 2 and 3, and those in the sidewalls 28 and 27, and serve the same purpose. In this modification the edge of the opening formed by removal of the knockout piece 32 is flush with the inner surface of the conduit box rather than the outer surface, but will bring the pipe into the box substantially flush with the surface to which the box and conduit are secured.

In either form the electrical conductor 24 may be brought straight into the conduit box without any offsets to hinder the feeding of the conductor through the pipe conduit into and out of the junction or outlet box 10.

If desired, further conventional means for additionally securing the conduit to the box 10 may be provided such as lugs (not shown) welded to the box alongside the circular opening and provided with set screws for secure engagement with the pipe conduit to prevent removal and also provide an additional electrical connection to conform to certain building requirements. However, this is not necessary since a strong physical and electrical connection is provided by the resilient action obtained with the present invention as shown.

Obviously many modifications and variations of the present invention are possible in the light of the above teachings. It is therefore to be understood that within the scope of the appended claims the invention may be practiced otherwise than as specifically described.

What is claimed is:

1. A conduit box comprising a portion defining an opening, a plurality of apertures spaced from said opening in diametrically opposite directions, and diametrically extending slots connecting said opening and said apertures, whereby a tool may be forced into one of said apertures to expand said opening to receive a conduit of slightly greater size.

2. A conduit box comprising a portion formed of resilient sheet material defining an opening, a plurality of circular apertures spaced from said opening in diametrically opposite directions, and diametrically extending elongated slots connecting said opening and said apertures, whereby a tool may be forced into one of said apertures to expand said opening to receive a conduit of slightly greater size than said opening and therefore cause said portion to grip the conduit when the tool is removed.

3. A flush entrance conduit box comprising two integral portions extending at right angles from a meeting edge, an integral knockout element partially cut out of said portions and having a substantially circular part with a slotted opening in one of said portions and a substantially rectangular part in the other portion, a plurality of circular apertures spaced outwardly in opposite directions from said circular part and said rectangular part, slots connecting said circular and rectangular parts and said apertures, whereby a conduit may be inserted in the opening formed by removal of said knockout element and be retained flush with the outer surface of said box.

4. A flush entrance conduit box comprising two integral portions extending at right angles from a meeting edge, an opening extending through adjacent portions and having a circular part in one portion and an adjoining rectangular part in the other portion, slots extending outwardly in opposite directions from said circular and rectangular parts of said opening, and a plurality of apertures across portions of each of said slots.

5. A conduit box comprising a bottom wall and side and end walls extending at right angles thereto from adjoining meeting edges, a plurality of openings formed along said meeting edges, a part of said openings being circular in certain walls of said box extending at right angles to said bottom wall and another part of certain of said openings being substantially rectangular in the bottom wall of said box, slots extending outwardly from said circular parts in said end and side walls, slots extending inwardly from said rectangular parts in said bottom walls, and a plurality of apertures spaced from said openings and extending across said slots.

References Cited in the file of this patent

UNITED STATES PATENTS

| | | |
|---|---|---|
| 1,605,168 | Burk et al. | Nov. 2, 1926 |
| 1,886,660 | Esping | Nov. 8, 1932 |
| 1,928,761 | Newman et al. | Oct. 3, 1933 |
| 2,316,389 | Atkinson | Apr. 13, 1943 |